(12) United States Patent
Lee

(10) Patent No.: US 7,919,206 B2
(45) Date of Patent: Apr. 5, 2011

(54) ELECTRODE ASSEMBLY AND SECONDARY BATTERY USING THE SAME

(75) Inventor: Jang-Ho Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 84 days.

(21) Appl. No.: 12/352,049

(22) Filed: Jan. 12, 2009

(65) Prior Publication Data
US 2009/0208825 A1     Aug. 20, 2009

(30) Foreign Application Priority Data
Feb. 20, 2008   (KR) ........................ 10-2008-0015350

(51) Int. Cl.
*H01M 6/10*     (2006.01)
(52) U.S. Cl. ........................ 429/164; 429/170; 429/178
(58) Field of Classification Search ................. 429/164, 429/170, 178
See application file for complete search history.

(56) References Cited

U.S. PATENT DOCUMENTS

| | | |
|---|---|---|
| 7,067,218 B2 | 6/2006 | Hong |
| 2005/0147878 A1* | 7/2005 | Miyahisa et al. ............. 429/174 |
| 2006/0172190 A1* | 8/2006 | Kaplin et al. ................ 429/161 |
| 2006/0216588 A1 | 9/2006 | Kim et al. |
| 2007/0231701 A1 | 10/2007 | Lee |

FOREIGN PATENT DOCUMENTS

| | | |
|---|---|---|
| JP | 01-307176 | 12/1989 |
| JP | 2004-22534 | 1/2004 |
| JP | 2006-173136 | 6/2006 |
| KR | 10-0670526 | 1/2007 |
| KR | 10-0696786 | 3/2007 |
| KR | 2007-97149 | 10/2007 |

OTHER PUBLICATIONS

Notice of Patent Allowance from the Korean Patent Registration Gazette for Korean Patent Application No. 10-2008-0015350 on Apr. 16, 2010.

English Abstract of Korean Patent Publication 10-2006-0112729 published Feb. 11, 2006.

* cited by examiner

*Primary Examiner* — Jane Rhee
(74) *Attorney, Agent, or Firm* — Knobbe Martens Olson & Bear LLP

(57) ABSTRACT

An electrode assembly and a secondary battery using the same, the electrode assembly including: first and second electrode plates, which are wound with a separator disposed therebetween; and first and second electrode tabs respectively adhered to the first and second electrode plates. The first electrode plate extends from a bottom surface of the electrode assembly, has a groove, and is bent at the groove. The secondary battery includes: the electrode assembly; a can to house the electrode assembly; and a cap assembly to seal the can. The first electrode tab is connected to the bottom of the can.

18 Claims, 3 Drawing Sheets

ELECTRODE ASSEMBLY AND SECONDARY BATTERY USING THE SAME

CROSS-REFERENCE TO RELATED APPLICATION

This application claims the benefit of Korean Application No. 2008-15350, filed Feb. 20, 2008, in the Korean Intellectual Property Office, the disclosure of which is incorporated herein by reference.

BACKGROUND OF THE INVENTION

1. Field of the Invention

Aspects of the present invention relate to an electrode assembly, and to a secondary battery including the same, and more particularly, to a secondary battery that protects an electrode assembly, and has improved safety and quality.

2. Description of the Related Art

A secondary battery can be repeatedly charged and discharged. Therefore, a secondary battery is more economical than a disposable battery. Further, as a secondary battery has high capacity in a small size, it is widely used to power portable electronic devices, such as a mobile phone, a notebook computer, a camcorder, a digital camera, and the like. Furthermore, as a secondary battery has a large capacity, it is used for high-power products, such as a hybrid vehicle, an electric tool, and the like.

Examples of a secondary battery include a nickel cadmium battery, a nickel metal hydride battery, a nickel zinc battery, a lithium ion secondary battery, a lithium polymer secondary battery, and the like. Among these batteries, lithium ion secondary batteries are widely used, because they can be small in size, have high capacities, high operating voltages, and high energy densities per unit weight.

A lithium ion secondary battery is made by disposing an electrode assembly and an electrolyte in a cell case, and then sealing the cell case. A lithium secondary battery can be classified as a can-type, or a pouch-type, depending on the configuration of the cell case. A can-type can be further classified as a cylinder-type or a prismatic-type.

A cylinder-type secondary battery is made by disposing an electrode assembly and an electrolyte in a cylindrical can, and then sealing the can with a cap assembly. In the electrode assembly, a positive electrode plate, a negative electrode plate, and a separator are stacked together, and wound.

First and second electrode tabs are connected to the positive electrode plate and the negative electrode plate. The first electrode tab extends toward the cap assembly, and the second electrode tab is drawn downward in the direction of the can. The first electrode tab is electrically connected to the cap assembly, and the second electrode tab is electrically connected to the can.

Before the electrode assembly is disposed in the can, the second electrode tab is bent toward a central portion of the electrode assembly, and welded to the can. If the second electrode tab is not bent at a predetermined position, the electrode assembly is pressed by the second electrode tab, and thus, may be damaged. On the contrary, if the second electrode tab is bent, so as to be excessively spaced apart from the electrode assembly, the electrode assembly is excessively spaced apart from the bottom of the can.

Thus, the electrode assembly may easily move up and down, and capacity may be reduced. If the electrode assembly moves, the second electrode tab is deformed. Thus, the electrode assembly may be damaged, and the second electrode tab may become detached from the can.

SUMMARY OF THE INVENTION

Aspects of the present invention provide an electrode assembly, and a secondary battery using the same. The electrode assembly is configured to improve the safety and quality of the secondary battery.

Aspects of the present invention provide an electrode assembly that includes: first and second electrode plates, a separator wound therebetween, and first and second electrode tabs respectively adhered to the first and second electrode plates. The first electrode tab extends from a bottom surface of the electrode assembly, has a groove, and is bent at the groove.

In another aspect of the present invention, the present invention provides a secondary battery that includes: an electrode assembly including first and second electrode plates, a separator wound therebetween, and first and second electrode tabs respectively adhered to the first and second electrode plates; a can to house the electrode assembly; and a cap assembly to seal the can. The first electrode tab extends from a bottom surface of the electrode assembly, has a groove, and is bent at the groove.

According to aspects of the present invention, the groove may be formed at a distance from the electrode assembly that corresponds to the distance from the electrode assembly to the bottom of the can.

According to aspects of the present invention, the groove may be formed at the same height as the bottom surface of the electrode assembly.

According to aspects of the present invention, the first electrode may be bent toward a central portion of the electrode assembly.

According to aspects of the present invention, the groove may be formed by depressing or notching a portion of the first electrode tab.

According to aspects of the present invention, the groove may be V-shaped, or U-shaped.

According to aspects of the present invention, the groove may be formed on an inner surface of the electrode tab.

According to aspects of the present invention, the groove may be formed on an outer surface of the electrode tab.

According to aspects of the present invention, a groove is formed in an electrode tab, and bending is performed at the groove, so that the electrode tab can be bent at a predetermined position. Accordingly, the electrode assembly can be prevented from being damaged by the electrode tab, the deformation of the electrode tab can be prevented, and safety and quality can be improved.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1:
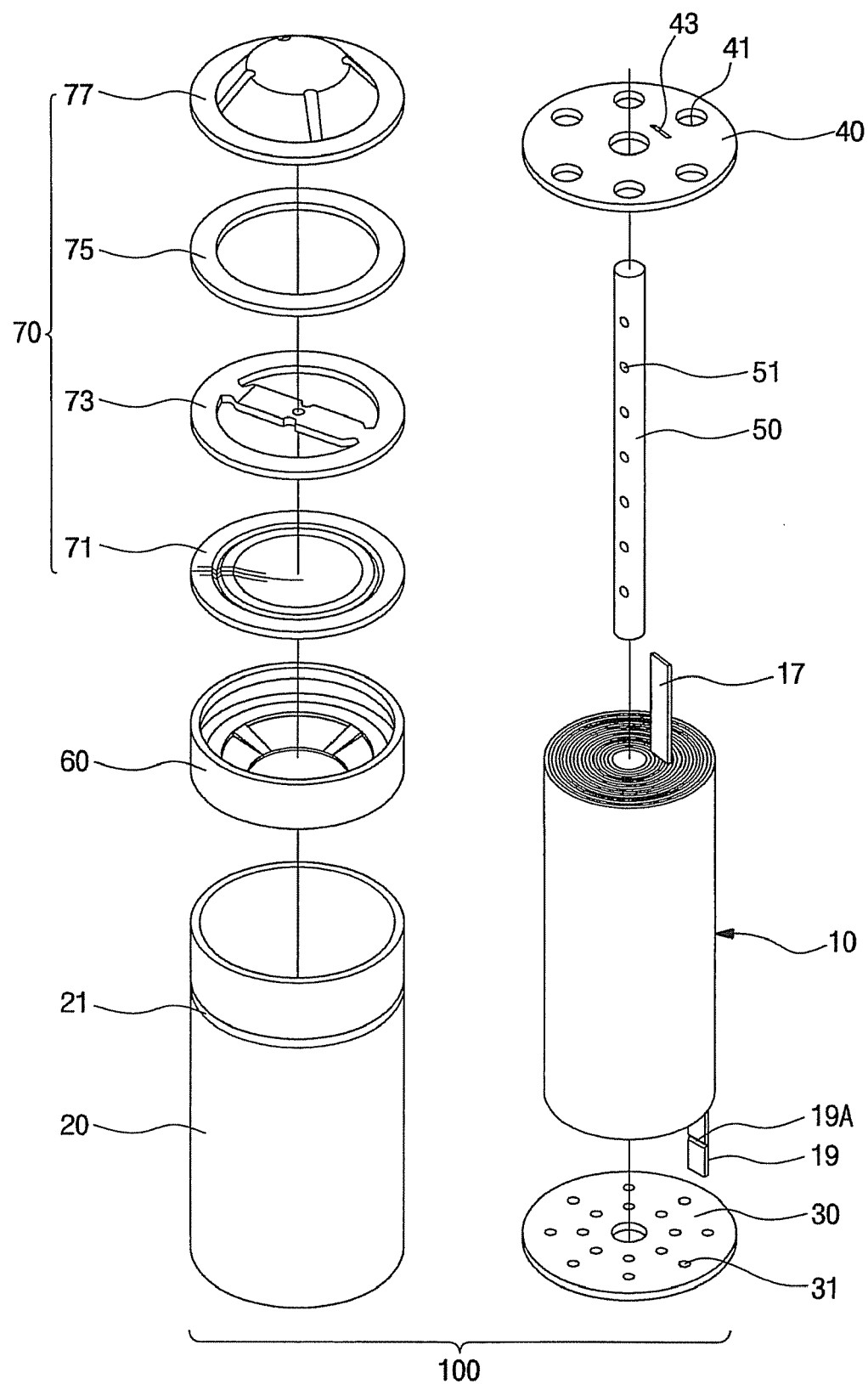
FIG. 1 is an exploded perspective view of a secondary battery, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 2:
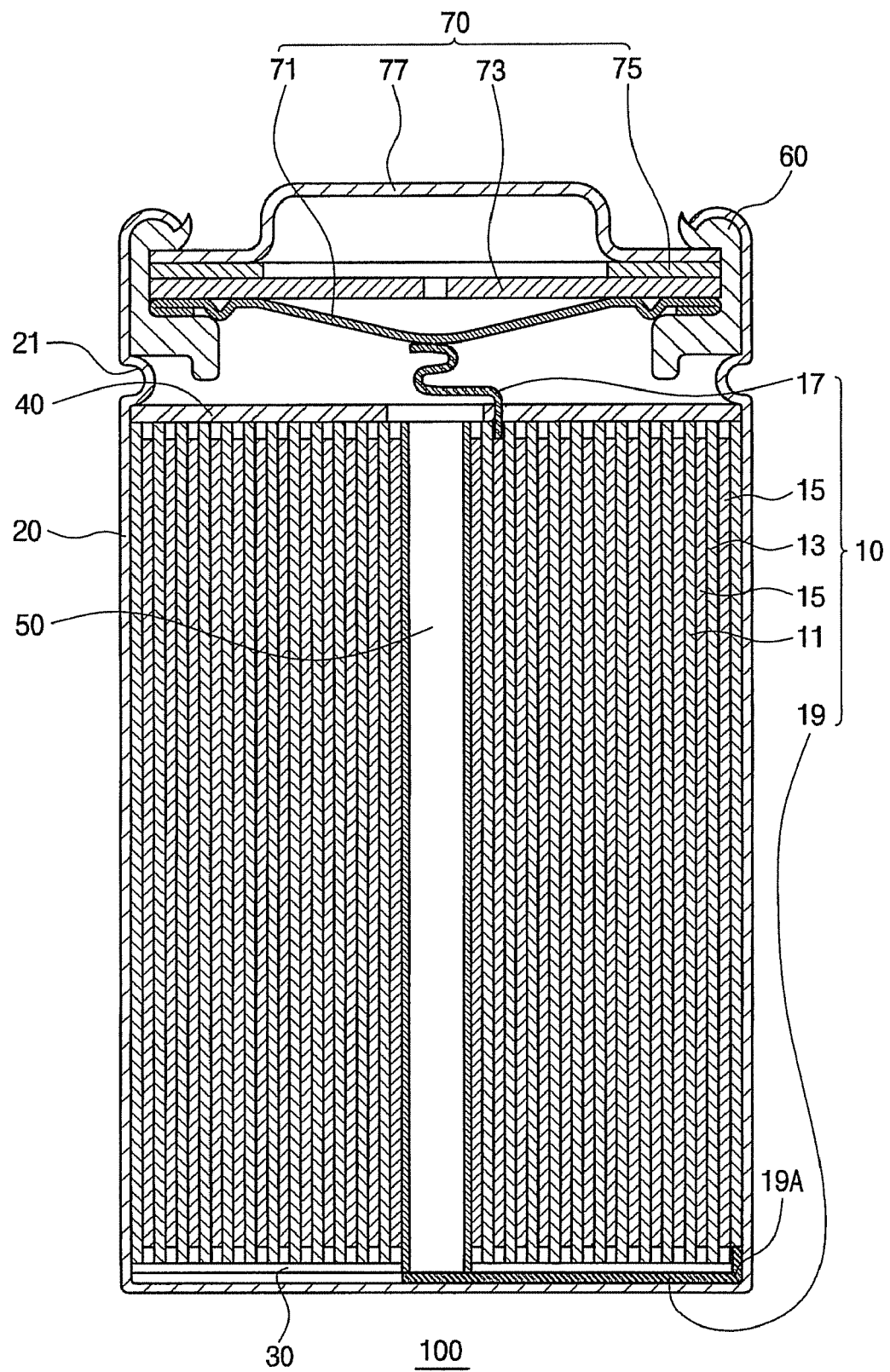
FIG. 2 is an assembled cross-sectional view of the secondary battery of FIG. 1.

FIG. 1 is an exploded perspective view of a secondary battery 100, according to an embodiment of the present invention, and FIG. 2 is an assembled cross-sectional view of the secondary battery 100. Referring to FIGS. 1 and 2, first and second rectangular electrode plates 11 and 13 are stacked and wound, resulting in a jelly roll-type electrode assembly 10.

The first and second electrode plates 11 and 13 have different polarities. A separator 15 is interposed between the first and second electrode plates 11 and 13, to prevent a short circuit between the two electrode plates 11 and 13. Each of the first and second electrode plates 11 and 13 is formed by coating a collector plate with positive electrode active material slurry, or negative electrode active material slurry. The collector plates can be made of aluminum or copper. The slurry is typically obtained by stirring a particulate active material, a subsidiary conductor, a binder, and a plasticizer, in a solvent.

Each of the first and second electrode plates 11 and 13 has a non-coating portion that is not coated with the slurry. First and second electrode tabs 17 and 19 are respectively adhered to the non-coating portions, so that an electric current can be applied to the first and second electrode tabs 17 and 19. The first electrode tab 17 extends from the top surface of the electrode assembly 10, toward an opening of a can 20, and the second electrode tab 19 extends from the bottom surface of the electrode assembly 10, toward the bottom of the can 20.

Alternatively, the first electrode tab 17 may extend toward the bottom of the can 20, and the second electrode tab 19 may extend toward the opening of the can 20. It will be apparent that the two electrode tabs 17 and 19 may extend in the same direction, depending on a battery forming process.

The second electrode tab 19 has a groove 19A, at which the second electrode tab 19 can be bent. The groove 19A may be formed by depressing or notching a portion of the second electrode tab 19.

Figure 3A:
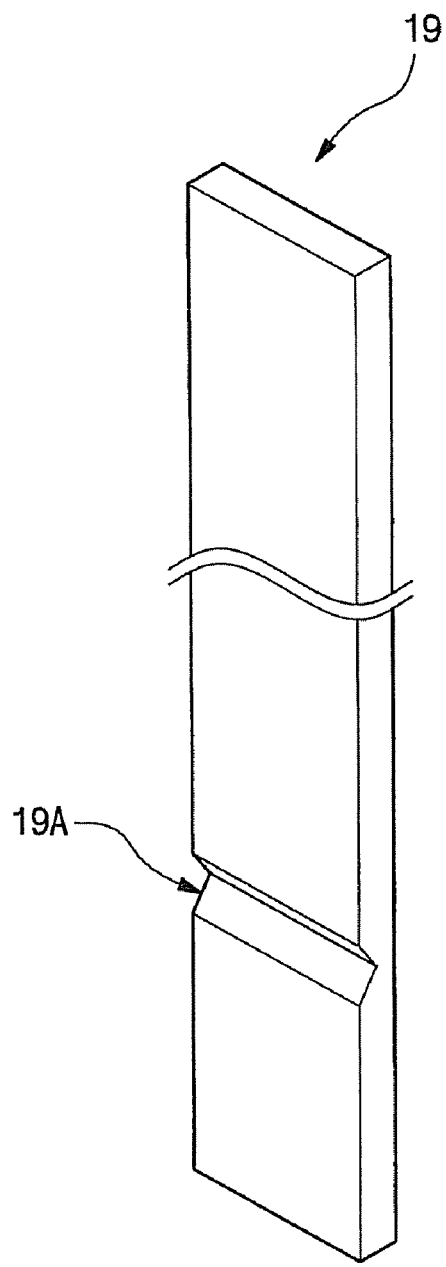
FIGS. 3A and 3B are perspective views showing various grooves formed in an electrode tab, according to exemplary embodiments of the present invention.
Figure 3B:
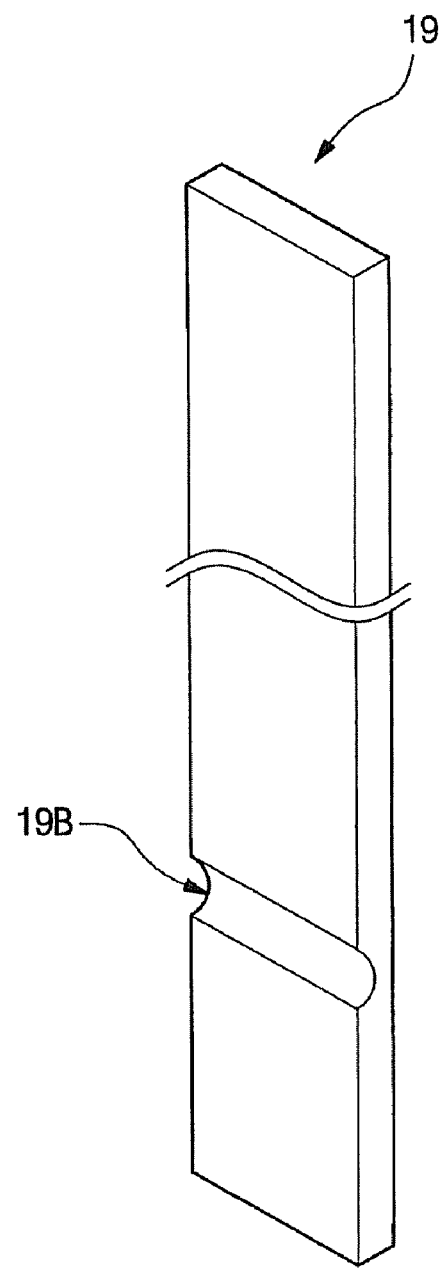

FIGS. 3A and 3B are perspective views showing various grooves on the second electrode tab 19, according to exemplary embodiments of the present invention. As shown in FIGS. 3A and 3B, an electrode tab 19 can have a V-shaped groove 19A, or a U-shaped groove 19B, for example. The grooves 19A and 19B may face toward the inside the can 20, or may face toward the outside of the can 20. For convenience, hereinafter only the groove 19A is referred to.

Referring to FIG. 2, the second electrode tab 19 is bent toward a central portion of the electrode assembly 10. If the groove 19A is too deep, the second electrode tab 19 may break, due to an external forces applied during the bending, or during use of the battery 100. If the groove 19A is too shallow, it may not serve as a guide for bending. For this reason, the depth of the groove 19A should be appropriately selected by those skilled in the art. The groove 19A is generally formed at a distance from the electrode assembly 10 that corresponds to the distance of the electrode assembly 10 from the bottom of the can 20.

When a lower insulating plate 30 is positioned beneath the bottom surface of the electrode assembly 10, the groove 19A is preferably formed at a distance corresponding to the thickness of the lower insulating plate 30. The groove 19A is preferably formed at the same height as a lower surface of the lower insulating plate 30. Accordingly, the second electrode tab 19 is bent at the groove 19A, so that it is possible to prevent the electrode assembly 10 from being damaged by the second electrode tab 19.

When the groove 19A is properly spaced from the electrode assembly 10, the second electrode tab 19 is positioned to be adhered to the bottom surface of the can 20, and/or to extend across the lower surface of the lower insulating plate 30. The groove 19A is preferably formed at the same height as the bottom surface of the electrode assembly. Accordingly, it is possible to prevent the electrode assembly 10 from moving up and down, and the distance between the second electrode tab 19 and the electrode assembly 10 can be reduced. When the lower insulating plate 30 is not included, the second electrode tab 19 or the bottom surface of the electrode assembly 10 can be coated, to prevent short circuits with the electrode assembly 10 or the second electrode tab 19.

The can 20 is made of a conductive metal, such as aluminum, stainless steel, or the like. The can have various shapes, such as cylindrical, prismatic, or the like. The can 20 has an opening at one end. The electrode assembly 10 is inserted into the can 20, through the opening, and the lower insulating plate 30 may be positioned beneath the bottom surface of the electrode assembly 10. Before the electrode assembly 10 is inserted into the can 20, the second electrode tab 19 is bent to be parallel with the bottom surface of the can 20. Since the bending is performed at the groove 19A, the bending is consistently performed at a predetermined position.

The electrode assembly 10 is a cylindrical jelly roll-type, and has a central hollow. The lower insulating plate 30 has a through-hole formed to face the central hollow of the electrode assembly 10, and a portion of the bent second electrode tab 19 faces the through-hole of the lower insulating plate 30. The lower insulating plate 30 has a plurality of holes 31, through which an electrolyte can flow.

A welding rod is inserted through the central hollow of the electrode assembly 10, to weld the second electrode tab 19 to the bottom surface of the can 10. Accordingly, the can 20 has the same polarity as the second electrode tab 19, and the can 20 serves as one electrode terminal.

An upper insulating plate 40 may be positioned on the top surface of the electrode assembly 10, and a center pin 50 is inserted into the central hollow of the electrode assembly 10. The upper insulating plate 40 may have a plurality of first holes 41, so that an electrolyte can easily flow to the electrode assembly 10. The upper insulating plate 40 may have a second hole 43, through which the first electrode tab 17 extends The center pin 50 prevents the electrode assembly 10 from being deformed, due to external forces. When a central portion of the center pin 50 is hollow, it serves as a passage, along which gas generated by the electrode assembly 10 flows.

The center pin 50 also suppresses deformations of the electrode assembly 10 caused by the charging and discharging thereof, thereby increasing lifetime of the battery. The center pin 50 may be cylindrical and/or tube-shaped. The center pin 50 may have a plurality of holes 51 to facilitate the penetration of an electrolyte, and to smoothly exhaust the gas generated by the electrode assembly 10, to the outside.

The can 20 has a bead 21 formed by crimping a sidewall of the can 20, above the upper insulating plate 40. The bead 21 secures the electrode assembly 10 within the can 20.

An insulating gasket 60 is inserted into the opening of the can 20, and a cap assembly 70 is coupled with the can 20, to seal the can 20. The insulating gasket 60 is an elastic material that is bent around the peripheral surface of the cap assembly 70. The insulating gasket 60 insulates the can 20 from the cap assembly 70, which have different polarities, and seals the can 20.

The cap assembly 70 may be assembled, and then disposed on the insulating gasket 60, or the components of the cap assembly 70 may be sequentially stacked on the gasket 60. The cap assembly 70 may include a vent 71 that is electrically connected to the first electrode tab 19, a current interrupt device (CID) 73 that is activated by operation of the vent 71, to interrupt a current path, a positive temperature coefficient (PTC) thermistor 75, and a cap-up 77 (electrode terminal). In the cap assembly 70, the vent 71, the CID 73, the PTC thermistor 75, and the cap-up 77 are stacked sequentially. The opening of the can 20 can be bent, to secure the cap assembly 70 in the insulating gasket 60, in order to seal the can 20.

When the internal gas generated by the electrode assembly 10 reaches a pressure that is above a predetermined level, the vent 71 activates the CID 73, to interrupt a flow of the current, and exhausts the gas to the outside.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. An electrode assembly comprising:
   first and second electrode plates that are wound together;
   a separator disposed between the electrode plates; and
   first and second electrode tabs respectively extending from the first and second electrode plates,
   wherein, the first electrode tab has a groove formed in a surface thereof, by reducing the thickness of a portion of the first electrode tab, and the first electrode tab extends from the first electrode plate, away from the electrode assembly, is bent at the groove, and then extends towards a central portion of the electrode assembly.

2. The electrode assembly according to claim 1, wherein the groove is formed at a distance from the electrode assembly that corresponds to a preselected distance from which the electrode assembly is to be spaced from the bottom of a can to house the electrode assembly.

3. The electrode assembly according to claim 1, wherein the groove is a notch formed in the first electrode tab.

4. The electrode assembly according to claim 1, wherein the groove is a V-shaped or U-shaped depression formed in the surface of the first electrode tab.

5. The electrode assembly according to claim 1, wherein the groove faces toward the direction in which the first electrode tab is bent.

6. The electrode assembly according to claim 1, wherein the groove faces away from the direction in which the first electrode tab is bent.

7. A secondary battery comprising:
   an electrode assembly comprising:
      first and second electrode plates that are wound together;
      a separator disposed between the electrode plates; and
      first and second electrode tabs respectively extending from the first and second electrode plates;
   a can to house the electrode assembly, having an open end and an opposing bottom; and
   a cap assembly to seal an opening of the can,
   wherein the first electrode tab has a groove formed in a surface thereof, by reducing the thickness of a portion of the first electrode tab, and the first electrode tab extends from the first electrode plate, in a direction generally perpendicular to the bottom of the can, is bent at the groove, and then extends generally parallel to the bottom of the can.

8. The secondary battery according to claim 7, wherein the groove is formed at a distance from the electrode assembly that corresponds to the distance from the electrode assembly to the bottom of the can.

9. The secondary battery according to claim 7, wherein the first electrode tab is bent toward a central portion of the electrode assembly.

10. The secondary battery according to claim 7, wherein the groove is a V-shaped or U-shaped depression formed in the surface of the first electrode tab.

11. The secondary battery according to claim 7, wherein the groove faces toward the inside of the can.

12. The secondary battery according to claim 7, wherein the groove faces toward the outside of the can.

13. The secondary battery according to claim 7, further comprising a lower insulating plate disposed between the electrode assembly and the bottom of the can,
   wherein the groove is formed such that the first electrode tab is bent to extend between the lower insulating plate and the bottom of the can.

14. The secondary battery according to claim 7, wherein the first electrode tab is attached to the bottom of the can.

15. The secondary battery according to claim 7, further comprising:
   an upper insulating plate disposed between the electrode assembly and the cap assembly; and
   a center pin inserted into the center of the electrode assembly.

16. The secondary battery according to claim 15, wherein the center pin is cylindrical, or tube-shaped.

17. The secondary battery according to claim 7, wherein the groove is disposed at a distance from the electrode assembly that is generally equal to the distance between the bottom surface of the electrode assembly and the bottom of the can.

18. The secondary battery according to claim 13, wherein the groove is formed at the same distance from the electrode assembly as a lower surface of the lower insulating plate.

* * * * *